(12) United States Patent
Sant et al.

(10) Patent No.: US 11,339,094 B2
(45) Date of Patent: May 24, 2022

(54) MITIGATION OF ALKALI-SILICA REACTION IN CONCRETE USING READILY-SOLUBLE CHEMICAL ADDITIVES

(71) Applicants: THE REGENTS OF THE UNIVERSITY OF CALIFORNIA, Oakland, CA (US); YARA INTERNATIONAL ASA, Oslo (NO); CONSTRUCTION RESEARCH & TECHNOLOGY GMBH, Trostberg (DE)

(72) Inventors: Gaurav N. Sant, Los Angeles, CA (US); Gabriel D. Falzone, Los Angeles, CA (US); Tandre Oey, Los Angeles, CA (US); Wolfram Franke, Los Angeles, CA (US); Paul Seiler, Los Angeles, CA (US); Erika Callagon La Plante, Los Angeles, CA (US)

(73) Assignees: The Regents of the University of California, Oakland, CA (US); Yara International ASA, Oslo (NO); CONSTRUCTION RESEARCH & TECHNOLOGY GMBH, Trostberg (DE)

( * ) Notice: Subject to any disclaimer, the term of this patent is extended or adjusted under 35 U.S.C. 154(b) by 92 days.

(21) Appl. No.: 16/638,720

(22) PCT Filed: Aug. 13, 2018

(86) PCT No.: PCT/US2018/046557
§ 371 (c)(1),
(2) Date: Feb. 12, 2020

(87) PCT Pub. No.: WO2019/036386
PCT Pub. Date: Feb. 21, 2019

(65) Prior Publication Data
US 2020/0369568 A1 Nov. 26, 2020

Related U.S. Application Data

(60) Provisional application No. 62/545,306, filed on Aug. 14, 2017.

(51) Int. Cl.
*C04B 22/08* (2006.01)
*C04B 14/06* (2006.01)
*C04B 14/22* (2006.01)
*C04B 20/10* (2006.01)
*C04B 22/12* (2006.01)
*C04B 28/02* (2006.01)
*C04B 103/60* (2006.01)
*C04B 111/20* (2006.01)

(52) U.S. Cl.
CPC ............ *C04B 22/085* (2013.01); *C04B 14/06* (2013.01); *C04B 14/22* (2013.01); *C04B 20/1074* (2013.01); *C04B 22/124* (2013.01); *C04B 28/02* (2013.01); *C04B 2103/603* (2013.01); *C04B 2111/2023* (2013.01)

(58) Field of Classification Search
CPC ..... C04B 14/06; C04B 14/22; C04B 20/1074; C04B 22/085; C04B 22/124; C04B 28/02; C04B 2103/603; C04B 2111/2023
See application file for complete search history.

(56) References Cited

U.S. PATENT DOCUMENTS

| | | | |
|---|---|---|---|
| 5,435,846 | A | 7/1995 | Tatematsu et al. |
| 5,928,420 | A | 7/1999 | Oates et al. |
| 8,021,477 | B2 | 9/2011 | Brown et al. |
| 9,382,157 | B2 | 7/2016 | Guzzetta et al. |
| 2013/0008355 | A1 | 1/2013 | Stokes |

FOREIGN PATENT DOCUMENTS

| | | | | |
|---|---|---|---|---|
| JP | H05-294693 A | 11/1993 | | |
| JP | H05-330878 A | 12/1993 | | |
| JP | 2002145650 A | * 5/2002 | ............ | C04B 20/10 |

OTHER PUBLICATIONS

Buck, "Alkali Reactivity of Strained Quartz as a Constituent of Concrete Aggregate", Aug. 1983, 17 pages.
International Search Report and Written Opinion, issued in corresponding International Appln. No. PCT/US2018/046557, 12 pages (dated Dec. 17, 2018).
Communication Pursuant to Rules 70(2) and 70a(2) EPC on EP 18845904.4 dated Apr. 28, 2021.
Extended European Search Report on EP 18845904.4 dated Apr. 7, 2021.
International Preliminary Report on Patentability on PCT/US2018/046557 dated Feb. 27, 2020.

* cited by examiner

*Primary Examiner* — Anthony J Green
(74) *Attorney, Agent, or Firm* — Foley Hoag LLP

(57) ABSTRACT

A manufacturing method includes: (1) incorporating at least one soluble, calcium, magnesium, or other divalent cation-containing additive into a concrete mixture including aggregates prone to alkali-silica reaction; and (2) curing the concrete mixture to form a concrete product.

13 Claims, 9 Drawing Sheets

US 11,339,094 B2

MITIGATION OF ALKALI-SILICA REACTION IN CONCRETE USING READILY-SOLUBLE CHEMICAL ADDITIVES

CROSS-REFERENCE TO RELATED APPLICATION

This application is a National Stage Entry of International Application No. PCT/US2018/046557, filed Aug. 13, 2018, which claims the benefit of U.S. Provisional Application No. 62/545,306, filed Aug. 14, 2017, the contents of which are incorporated herein by reference in their entirety.

STATEMENT REGARDING FEDERALLY SPONSORED RESEARCH OR DEVELOPMENT

This invention was made with government support under Grant Number 1253269, awarded by the National Science Foundation, and under Grant Number DE-NE0008398, awarded by the U.S. Department of Energy. The Government has certain rights in the invention.

TECHNICAL FIELD

This disclosure generally relates to mitigation of alkali-silica reaction in concrete.

BACKGROUND

Alkali-silica reaction (ASR) is a deleterious chemical reaction that can produce expansive stresses in concrete. The mechanism of ASR involves the reaction of certain types of aggregates including reactive forms of silica with alkaline pore solutions that result from cement hydration. In particular, silicon from reactive silica dissolves into an alkaline pore solution to form a gel that precipitates in spaces or cracks around reactive aggregate particles. When this gel is exposed to moisture, it expands, creating stresses that can cause cracks in concrete. This expansion and cracking reduces the service life of concrete structures.

One mitigation measure against ASR involves the use of non-reactive aggregates. However, the availability of aggregates that are not prone to deleterious ASR is dwindling, involving transportation of non-reactive aggregates over long-distances. Other mitigation measures are chemical methods of mitigation that rely on the use of supplementary cementitious materials, such as fly ash, or using lithium salts. However, the efficacy of these supplementary cementitious materials can be highly variable, due to compositional variation and seasonal supply of these materials, or can involve high cost in the case of lithium salts.

It is against this background that a need arose to develop the embodiments described herein.

SUMMARY

In some embodiments, a manufacturing method includes: (1) incorporating at least one soluble calcium-containing additive into a concrete mixture including aggregates prone to alkali-silica reaction (ASR); and (2) curing the concrete mixture to form a concrete product.

In additional embodiments, a manufacturing method includes: (1) incorporating at least one magnesium-containing additive, or other divalent cation-containing additive, into a concrete mixture including aggregates prone to ASR; and (2) curing the concrete mixture to form a concrete product.

In additional embodiments, a concrete product includes: (1) a binder; (2) aggregates dispersed within the binder; and (3) a calcium-containing interfacial layer at least partially covering the aggregates.

In additional embodiments, a concrete product includes: (1) a binder; (2) aggregates dispersed within the binder; and (3) a magnesium-containing interfacial layer at least partially covering the aggregates.

Additional embodiments relate to a calcium-containing additive, a magnesium-containing additive, or other divalent cation-containing additive for use in suppressing ASR in a concrete mixture including ASR-prone aggregates.

Additional embodiments relate to use of a calcium-containing additive, a magnesium-containing additive, or other divalent cation-containing additive for suppressing ASR in a concrete mixture including ASR-prone aggregates.

Further embodiments relate to use of a calcium-containing additive, a magnesium-containing additive, or other divalent cation-containing additive in the manufacture of a concrete product including ASR-prone aggregates.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1:
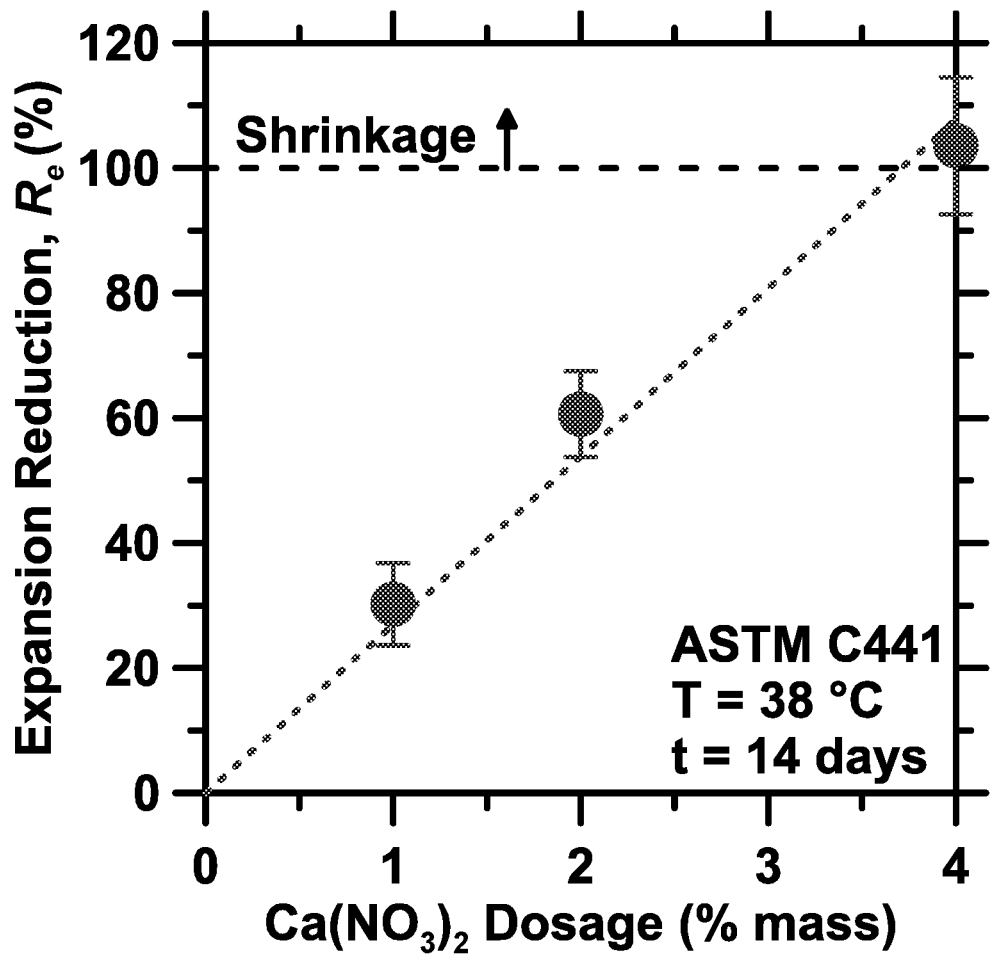
FIG. 1. Reduction in expansion induced by alkali-silica reaction (ASR) as a function of calcium nitrate dosage (expressed as a percentage by mass of ordinary Portland cement (OPC) contained in a concrete mixture) in prismatic specimens of cementitious mortars. This data was acquired following a slight modification of the ASTM C441 procedure, utilizing calcium nitrate rather than fly ash to mitigate expansion. The expansion reduction ($R_e$) was calculated as a difference between the average increase in length of reference prismatic mortar specimens ($E_r$), and the average increase in length of prismatic mortar specimens dosed with calcium nitrate ($E_{CN}$), namely, $R_e=(E_r-E_{CN})\times 100\%$.

Embodiments of this disclosure are directed to inhibition of alkali-silica reaction (ASR) through the use of abundant, readily-soluble cost-effective chemical additives. In some embodiments, concrete including ASR-prone aggregates can be formed to feature reduced expansion, resulting from dosing of calcium-containing chemical additives (e.g., calcium-containing salts, such as calcium nitrate ($Ca(NO_3)_2$), calcium nitrite ($Ca(NO_2)_2$), or calcium chloride ($CaCl_2$), among others). In some embodiments, a calcium-containing chemical additive is dosed into a concrete mixture to provide a source of calcium in a mobilized or soluble form in a mixing water, which includes a combination of a cement, the mixing water, ASR-prone aggregates (coarse, fine, or both), and, optionally, a supplementary cementitious material. To mitigate expansion induced by ASR, dosages of a calcium-containing chemical additive ranging from about 0.1% to about 20% by mass of a cement included in a concrete mixture can be used in some embodiments, depending on a cement composition and an amount or a reactivity of aggregates used. In some embodiments, dosages may be calculated with reference to a mass of a cementitious binder, a mass of reactive aggregates, a surface area of reactive aggregates, or other characteristic of a concrete formulation, as may be desirable depending upon the specific application and service conditions. In place of, or in combination with, dosing of calcium-containing chemical additives, inhibition of ASR can be attained by dosing of magnesium-containing chemical additives (e.g., magnesium-containing salts) or other divalent cation-containing chemical additives.

In some embodiments, the mechanism of ASR inhibition is based on the formation of enveloping, stable calcium-containing reaction products at an interface between reactive aggregates and a cementitious pore solution within a concrete mixture. These calcium-containing products serve as an interfacial barrier that form at the interface, by reducing the reactive surface area of the aggregates mitigate against their further dissolution, thereby reducing the tendency for the formation of gels that can yield deleterious expansion.

In some embodiments, the mechanism of ASR inhibition is based on the formation of enveloping, stable magnesium-containing reaction products, or other divalent cation-containing reaction products, at an interface between reactive aggregates and a cementitious pore solution within a concrete mixture. These magnesium-containing products or other divalent cation-containing reaction products serve as an interfacial barrier that form at the interface, by reducing the reactive surface area of the aggregates mitigate against their further dissolution, thereby reducing the tendency for the formation of gels that can yield deleterious expansion.

The following are example embodiments of this disclosure.

In some embodiments, a manufacturing method of a concrete product includes incorporating at least one soluble calcium-containing additive (or other additive) into a concrete mixture (or other cementitious composition) including a cement, water, and aggregates.

In some embodiments, a calcium-containing additive is a calcium-containing salt. Examples of suitable calcium-containing salts include calcium nitrate, calcium chloride, calcium nitrite, and mixtures or combinations of two or more of the foregoing. Suitable additives can include those that are readily water soluble and/or have a high water solubility. In some embodiments, water solubility of a calcium-containing salt or other additive can be represented in terms of an upper threshold amount of the salt that can dissolve in water to form a substantially homogenous solution, expressed in terms of grams of the salt per 100 grams of water and measured at, for example, 20° C. and 1 atmosphere or another set of reference conditions. Examples of suitable additives include those having a water solubility, measured at 20° C. and 1 atmosphere, of at least about 0.5 g/(100 g of water), at least about 1 g/(100 g of water), at least about 5 g/(100 g of water), at least about 8 g/(100 g of water), at least about 10 g/(100 g of water), at least about 15 g/(100 g of water), at least about 20 g/(100 g of water), at least about 30 g/(100 g of water), at least about 40 g/(100 g of water), or at least about 50 g/(100 g of water). Since calcium nitrate, calcium nitrite, calcium chloride, and their magnesium variants are readily soluble in water, desired amounts of any one, or any combination of, calcium nitrate, calcium nitrite, and calcium chloride can be added in a solution form into a mixing water used to form a concrete mixture. Alternatively, or in conjunction, any one, or any combination of, calcium nitrate, calcium nitrite, and calcium chloride can be added directly into a cement clinker or a cement powder by addition or replacement as a powder. Other suitable additives listed above also can be incorporated into a mixing water, a cement clinker or powder, or both. In place of, or in combination with, a calcium-containing additive, a magnesium-containing additive, or other divalent cation-containing additive, can be incorporated into a concrete mixture, and the foregoing discussion and the following discussion are also applicable for such additive. Examples of suitable magnesium-containing additives include magnesium-containing salts, such as magnesium chloride.

Examples of cements include Portland cement, including ASTM C150 compliant ordinary Portland cements (OPCs) such as Type I OPC, Type Ia OPC, Type II OPC, Type II(MH) OPC, Type IIa OPC, Type II(MH)a OPC, Type III OPC, Type IIIa OPC, Type IV OPC, and Type V OPC, as well as blends or combinations of two or more of such OPCs, such as Type I/II OPC, Type II/V OPC, and so forth. Other cements are encompassed by this disclosure, such as a calcium sulfoaluminate cement and a calcium aluminate cement. In some embodiments, aggregates include either, or both, coarse aggregates and fine aggregates. In some embodiments, the aggregates include silica and are prone to deleterious ASR, such as silicate glass (e.g., borosilicate glass), quartz (e.g., strained or microcrystalline quartz), other silica-containing aggregates (e.g., silica-containing minerals or other aggregates including at least about 5%, at least about 10%, at least about 20%, at least about 30%, at least about 40%, or at least about 50% by mass of silica), and mixtures or combinations of two or more of the foregoing. In some embodiments, the aggregates are included in an amount of at least about 1% by volume, relative to a total volume of a concrete mixture, such as at least about 5% by volume, at least about 10% by volume, at least about 15% by volume, or at least about 20% by volume, and up to about 25% by volume, or more. In some embodiments, a concrete mixture also optionally includes one or more supplementary cementitious materials, such as fly ash, slag, metakaolin, and so forth.

In some embodiments, at least one calcium-containing additive (or other additive) is introduced into a concrete mixture in a non-zero amount corresponding to at least about 0.1% by mass, relative to a mass of a cement included in the concrete mixture, such as at least about 0.2% by mass, at least about 0.5% by mass, at least about 1% by mass, at least about 2% by mass, at least about 3% by mass, at least about 4% by mass, or at least about 5% by mass, and up to about 8% by mass, up to about 10% by mass, up to about 15% by mass, up to about 20% by mass, or more. In some embodiments, two or more different calcium-containing additives (or other additives) are introduced into a concrete mixture in a combined amount corresponding to at least about 0.1% by mass, relative to a total mass of the cement in the concrete mixture, such as at least about 0.2% by mass, at least about 0.5% by mass, at least about 1% by mass, at least about 2% by mass, at least about 3% by mass, at least about 4% by mass, or at least about 5% by mass, and up to about 8% by mass, up to about 10% by mass, or more. In some embodiments, at least one calcium-containing additive (or other additive) is introduced into a concrete mixture in an amount sufficient to attain an initial concentration of calcium ions in a pore solution of the concrete mixture of at least about 5 millimolar (mM), such as at least about 10 mM, as at least about 20 mM, as at least about 30 mM, at least about 100 mM, at least about 200 mM, at least about 300 mM, at least about 400 mM, or at least about 500 mM, and up to about 800 mM, up to about 1000 mM, or more.

In some embodiments, at least one calcium-containing additive (or other additive) is introduced into a concrete mixture in an amount that is adjusted or otherwise varied according to an amount of aggregates used, a reactivity of the aggregates used, or both. A reactivity of aggregates can be assessed by, for example, assessing dissolution rate of silicon when the aggregates are immersed in an alkaline solution, assessing an extent of expansion when the aggregates are incorporated into a concrete mixture in the absence of an additive to mitigate ASR, or assessing an amount of silica included in the aggregates. For example, an amount of a calcium-containing additive (or other additive) is increased or decreased within the above-stated ranges according to a greater amount of aggregates used, a greater reactivity of the aggregates used, or both. As another example, an amount of a calcium-containing additive (or other additive) is decreased or increased within the above-stated ranges according to a lesser amount of aggregates used, a lesser reactivity of the aggregates used, or both.

In some embodiments, identification is made that aggregates to be included in a concrete mixture are reactive aggregates prone to ASR, and, responsive to the identification, at least one calcium-containing additive (or other additive) is introduced into the concrete mixture.

Once formed, a concrete mixture is cured (e.g., water-cured) to promote hydration reactions to form a resulting concrete product. In some embodiments, curing is performed at a temperature of about 20° C. or greater, such as about 25° C. or greater, about 30° C. or greater, or about 35° C. or greater, and up to about 45° C. or greater. In some embodiments, curing is performed at a temperature below about 20° C. In some embodiments, the concrete product includes a cementitious binder (resulting from hydration reactions of a cement) and aggregates dispersed within the binder, and, in the case of dosing of a calcium-containing additive, also includes a calcium-containing interfacial barrier or layer at least partially coating, covering, or surrounding the aggregates. In some embodiments, the calcium-containing interfacial barrier includes calcium-silicate-hydrate ($xCaO.SiO_2.yH_2O$ or CSH) and calcite ($CaCO_3$). In some embodiments, the calcium-containing interfacial barrier is in the form of discrete calcium-containing precipitates coating, covering, or surrounding the aggregates (see FIG. 2). In the case of dosing of a magnesium-containing additive, the concrete product includes a magnesium-containing interfacial barrier or layer at least partially coating, covering, or surrounding the aggregates, and the magnesium-containing interfacial barrier can include magnesium-silicate-hydrate ($xMgO.SiO_2.yH_2O$ or MSH) and magnesite ($MgCO_3$).

In some embodiments, a manufacturing method of a concrete product includes subjecting ASR-prone aggregates to pre-treatment to form pre-treated aggregates, and incorporating the pre-treated aggregates into a concrete mixture (or other cementitious composition) including a cement, water, and the pre-treated aggregates. In some embodiments, subjecting the ASR-prone aggregates to pre-treatment includes exposing the ASR-prone aggregates to a calcium-containing additive, a magnesium-containing additive, or other divalent cation-containing additive, such as by immersion of the ASR-prone aggregates in, or otherwise exposing the ASR-prone aggregates to, an aqueous solution of such additive. In some embodiments, subjecting the ASR-prone aggregates to pre-treatment includes forming a calcium-containing interfacial barrier, a magnesium-containing interfacial barrier, or other divalent cation-containing interfacial barrier at least partially coating, covering, or surrounding the aggregates. In some embodiments, the method also includes curing the concrete mixture to form a concrete product.

Other embodiments relate to a calcium-containing additive (or a magnesium-containing additive or other divalent cation-containing additive) for use in suppressing ASR in a concrete mixture including ASR-prone aggregates. Additional embodiments relate to use of a calcium-containing additive (or a magnesium-containing additive or other divalent cation-containing additive) for suppressing ASR in a concrete mixture including ASR-prone aggregates. Further embodiments relate to use of a calcium-containing additive (or a magnesium-containing additive or other divalent cation-containing additive) in the manufacture of a concrete product including ASR-prone aggregates for suppressing ASR.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Calcium Nitrate Suppresses Alkali-Silica Reaction by Forming Interfacial Barriers on Reactive Silicates As set forth in this example, the mechanism of alkali-silica reaction (ASR) inhibition is based on the formation of durable, stable calcium-containing reaction products or precipitates at an interface between reactive aggregates and a cementitious pore solution within a concrete mixture. These calcium-containing products at the interface mitigate against further dissolution of the aggregates by reducing reactive surface area, and reducing the formation of a gel that can yield deleterious expansion. Evaluations following a slight modification of the procedure outlined in ASTM C441 indicate that ASR-induced expansion is fully mitigated at a dosage of about 4% of calcium nitrate by mass of a cement (see FIG. 1). Advantageously, calcium-containing salts, such as calcium nitrate, are relatively inexpensive, and such calcium-containing salts can serve as a source of calcium in solution form, providing controllable, reliable improvements. Significantly, the dosing of calcium-containing salts can also be used to increase the effectiveness of calcium-containing coal fly ashes (e.g., Class C as per ASTM C618) in mitigating expansion due to ASR.

Figure 2:
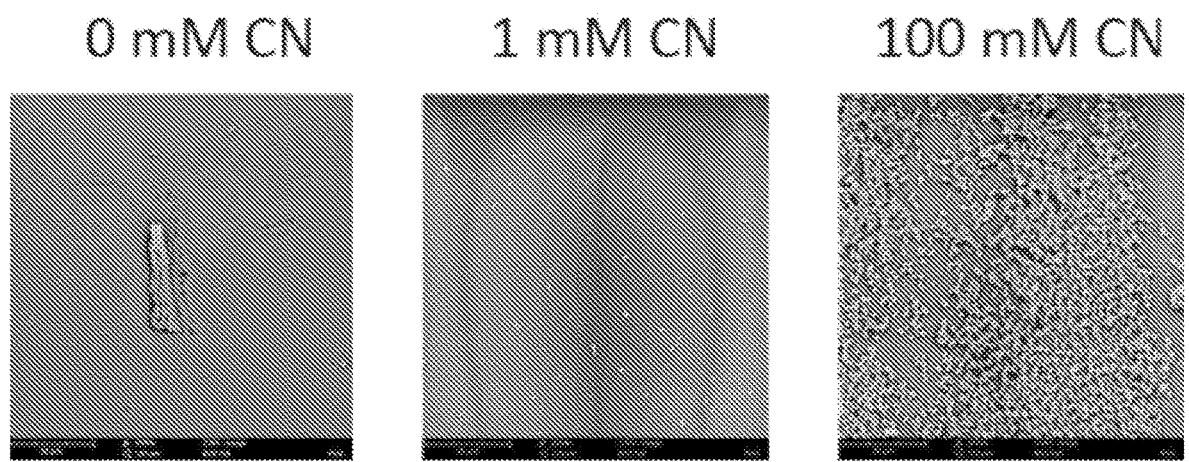
FIG. 2. Scanning electron microscopy (SEM) images showing surfaces of aggregates covered by calcium-containing reaction products, with the amount of calcium-containing products and extent of surface coverage increasing with increasing concentration of calcium nitrate.
Figure 3:
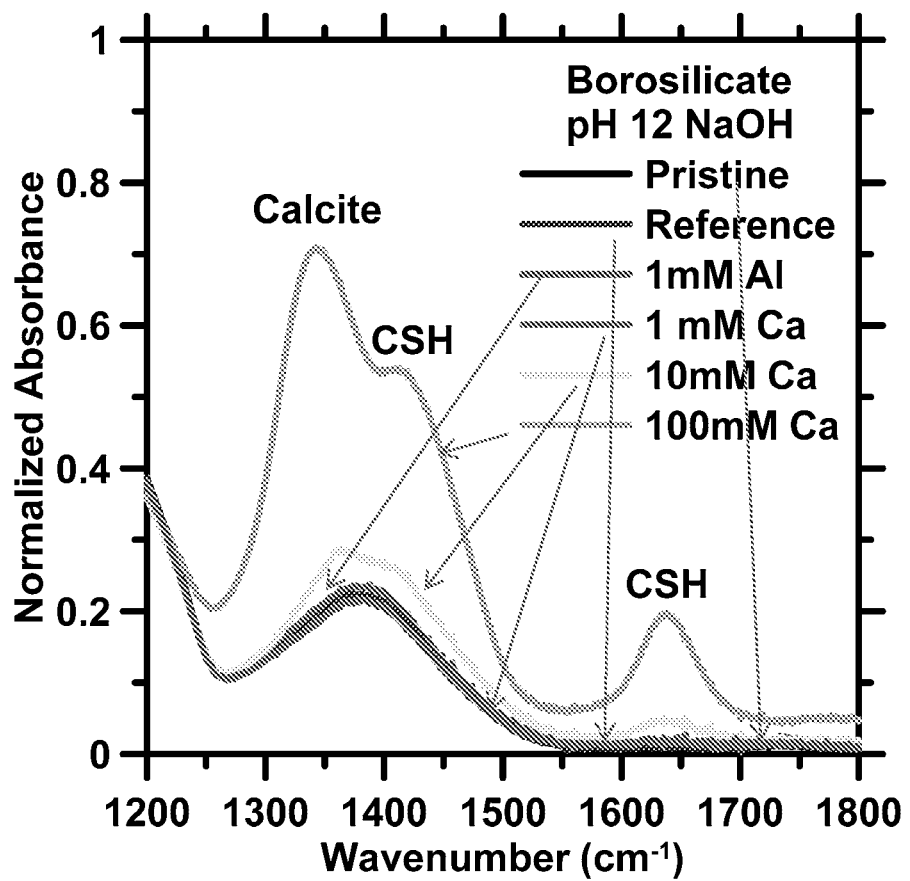
FIG. 3. Fourier-transform infrared spectroscopy (FTIR) results identifying reaction products as a combination of calcium-silicate-hydrates (CSHs) and calcite. Results are shown for aggregates (borosilicate glass) immersed in a solution at a pH of about 12 with increasing concentration of calcium nitrate, in comparison with dosing of aluminum, absence of dosing of any additive in the solution (reference), and pristine aggregate without immersion in the solution (pristine).
Figure 4:
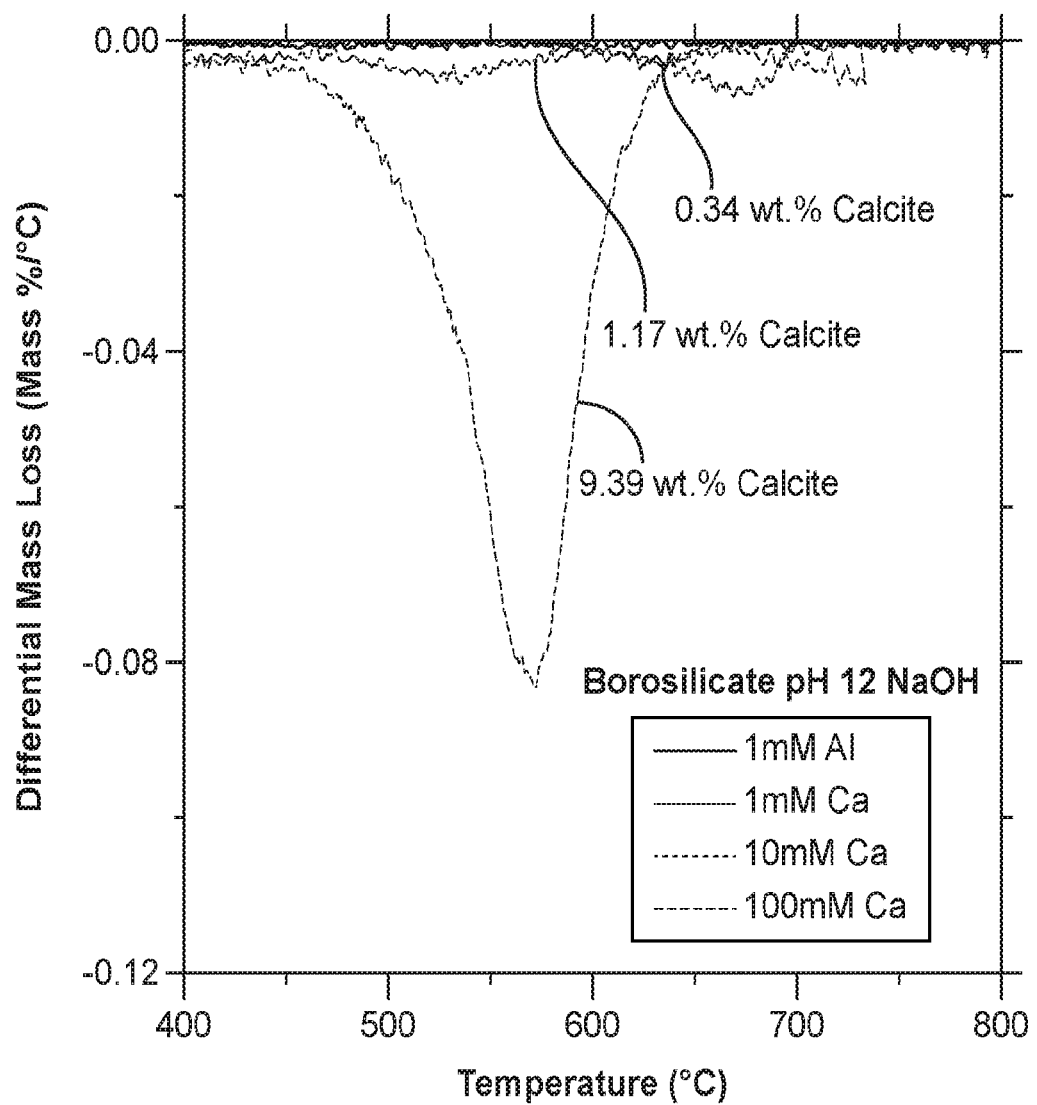
FIG. 4. Thermal analysis (TGA) results quantitatively confirming the presence of calcite in reaction products. Results are shown for aggregates (borosilicate glass) immersed in a solution at a pH of about 12 containing dissolved $CO_2$ with increasing concentration of calcium nitrate, in comparison with dosing of aluminum.

Scanning electron microscopy (SEM) images show surfaces of aggregates being covered by calcium-containing reaction products, with the amount of calcium-containing products and extent of surface coverage increasing with increasing concentration of calcium nitrate (see FIG. 2, with concentration of calcium nitrate (CN) at 0 mM, about 1 mM, and about 100 mM). Fourier-transform infrared spectroscopy (FTIR) identified reaction products as a combination of calcium-silicate-hydrate (CSH) and calcite (see FIG. 3). Thermal analysis (TGA) quantitatively confirmed the presence of calcite (see FIG. 4).

Figure 5:
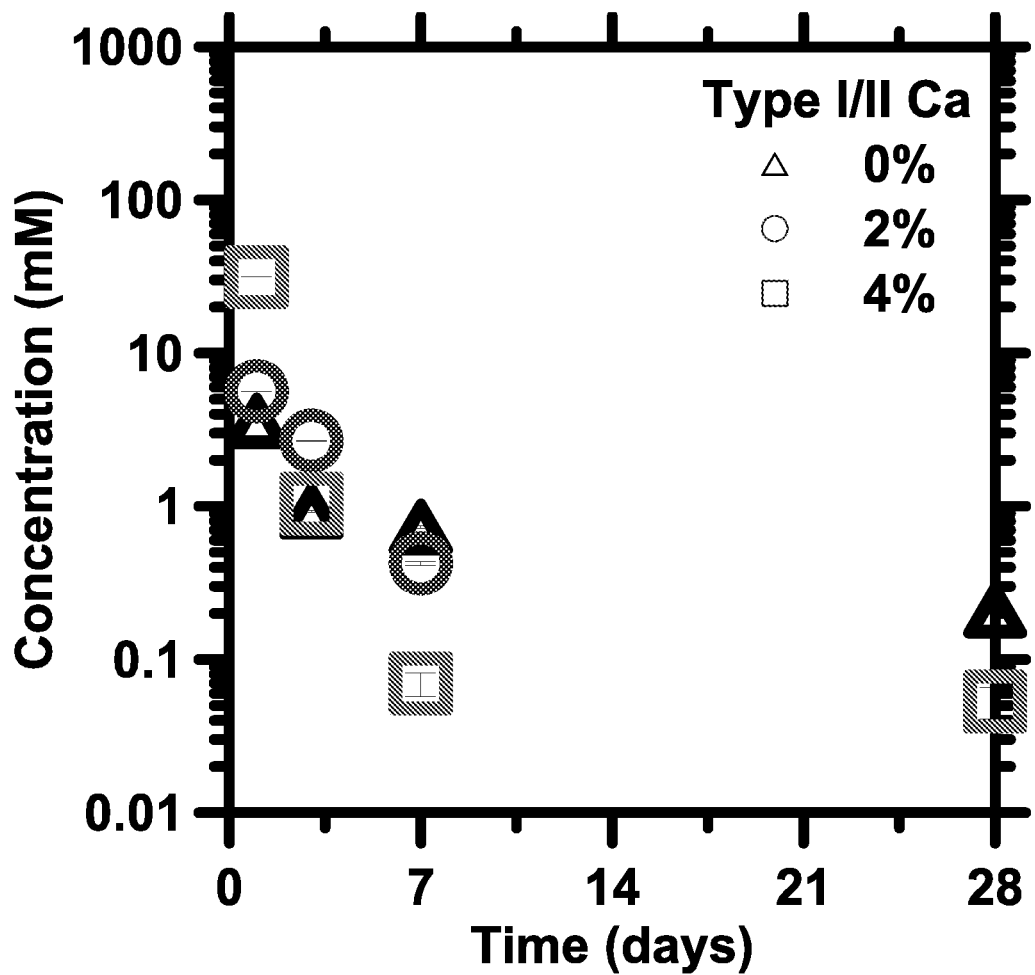
FIG. 5. Measurements of the concentrations of calcium ions in pore solutions of concrete mixtures, with varying calcium nitrate dosage (expressed as a percentage by mass of a cement contained in the concrete mixtures) and as a function of time.

Measurements were made of the concentrations of calcium ions in pore solutions of cement mixtures, with varying initial (dosing) concentrations of calcium ions and as a function of time. As shown in FIG. 5, the concentrations of calcium ions in the pore solutions at day 7 and beyond are reduced below levels in a reference cement mixture without any dosing. These results indicate that calcium is likely not present at sufficient levels to participate in altering precipitation of gels, and is likely not present at sufficient levels to become part of precipitates of gels and alter their properties. Rather, the mechanism of ASR inhibition is based on the formation of interfacial barriers that reduce reactive surface area. Calcium nitrate can have an additional effect of accelerating early cement hydration by attaining an earlier setting time; however, the strength developed at steady-state is not enhanced. Hence, expansion reduction from dosing of calcium nitrates derives from reduced aggregate dissolution, rather than a greater strength or a greater stress-resistance.

Figure 6:
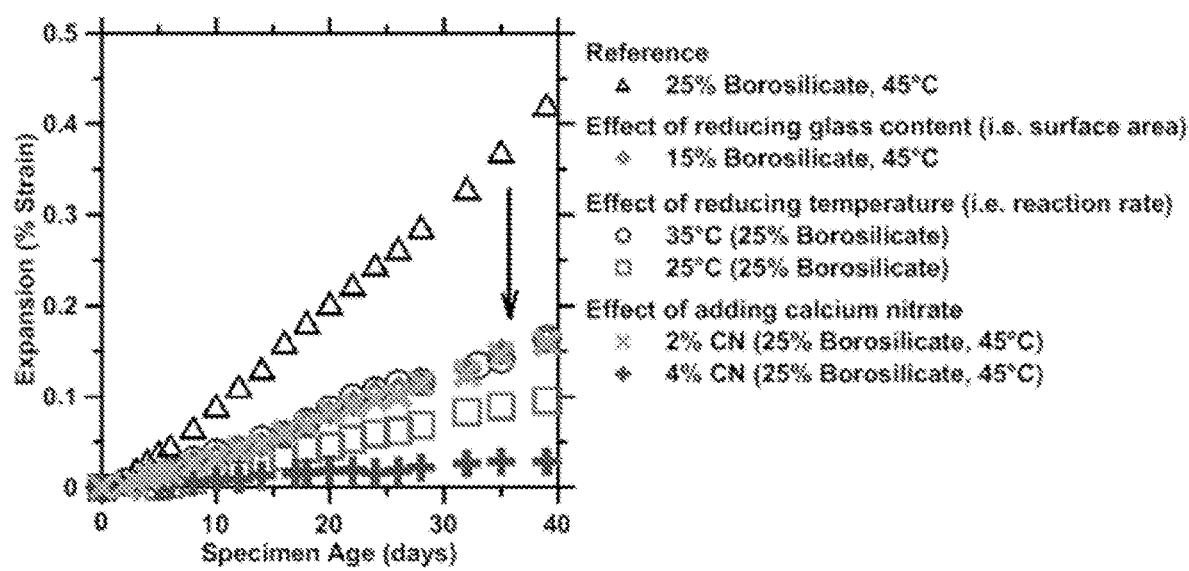
FIG. 6. Comparisons of expansion reductions in concrete mixtures with dosing of calcium nitrate (dosage expressed as a percentage by mass of a cement contained in the concrete mixtures) and other mitigation measures, namely reducing content of aggregates (content expressed as a volume fraction of aggregates relative to a total volume of the concrete mixtures) and reducing temperature.

Comparisons were made of expansion reductions in concrete mixtures with dosing of calcium nitrate and other mitigation measures, namely reducing content of aggregates (reducing reactive surface area) and reducing temperature (reducing reaction rate). As shown in FIG. 6, a dosage of about 2% of calcium nitrate attains a comparable reduction as about 10% reduction in reactive aggregate volume, or an about 10° C. drop in temperature, and a dosage of about 4% of calcium nitrate exceeds expansion reduction achieved by an about 20° C. drop in temperature.

Figure 7:
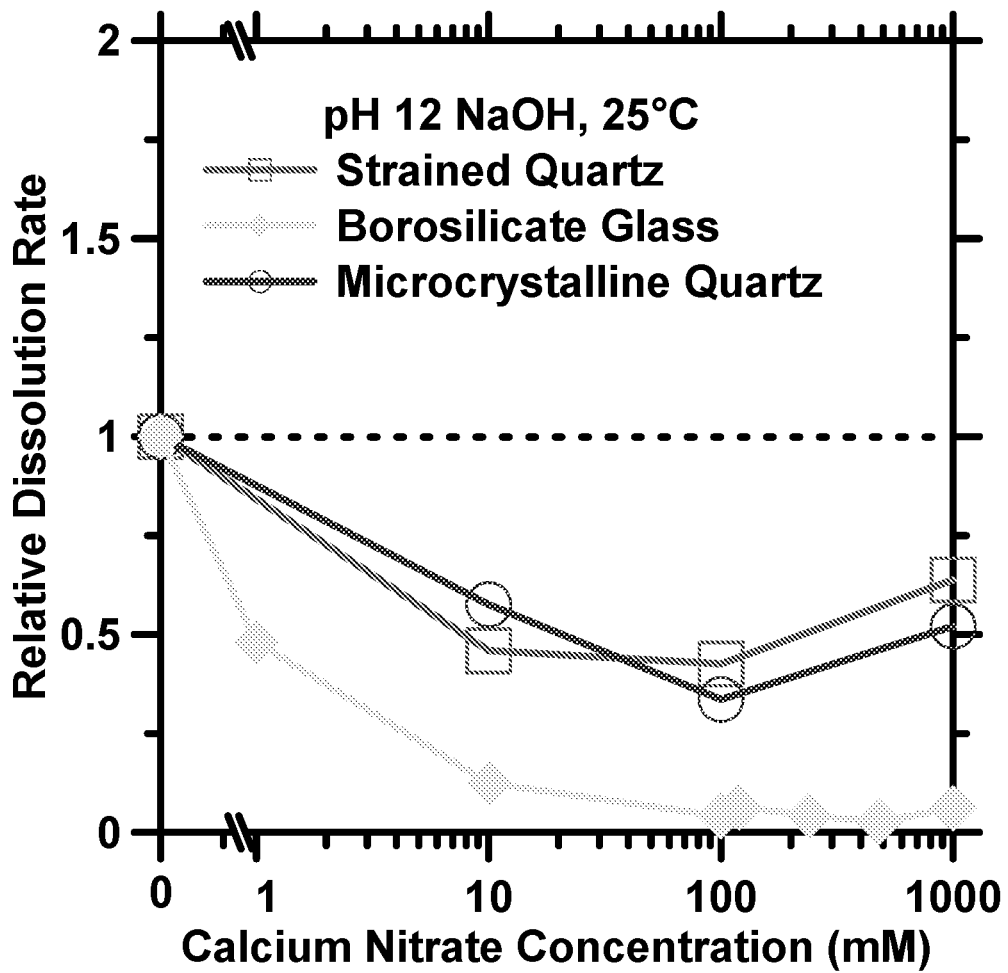
FIG. 7. Measurements of aqueous dissolution rates of different types of reactive aggregates immersed in a solution at a pH of about 12 with varying dosing concentrations of calcium nitrate.

Measurements were made of dissolution rates of different types of reactive aggregates immersed in a solution at a pH of about 12 with varying dosing concentrations of calcium nitrate. As shown in FIG. 7, in addition to reductions in dissolution rates for borosilicate glass, reductions in dissolution rates are observed for other types of reactive aggregates, including strained quartz and microcrystalline quartz, indicating wide-ranging applicability of calcium-nitrate, and the stated soluble divalent cation salt approach, for ASR inhibition.

Figure 8:
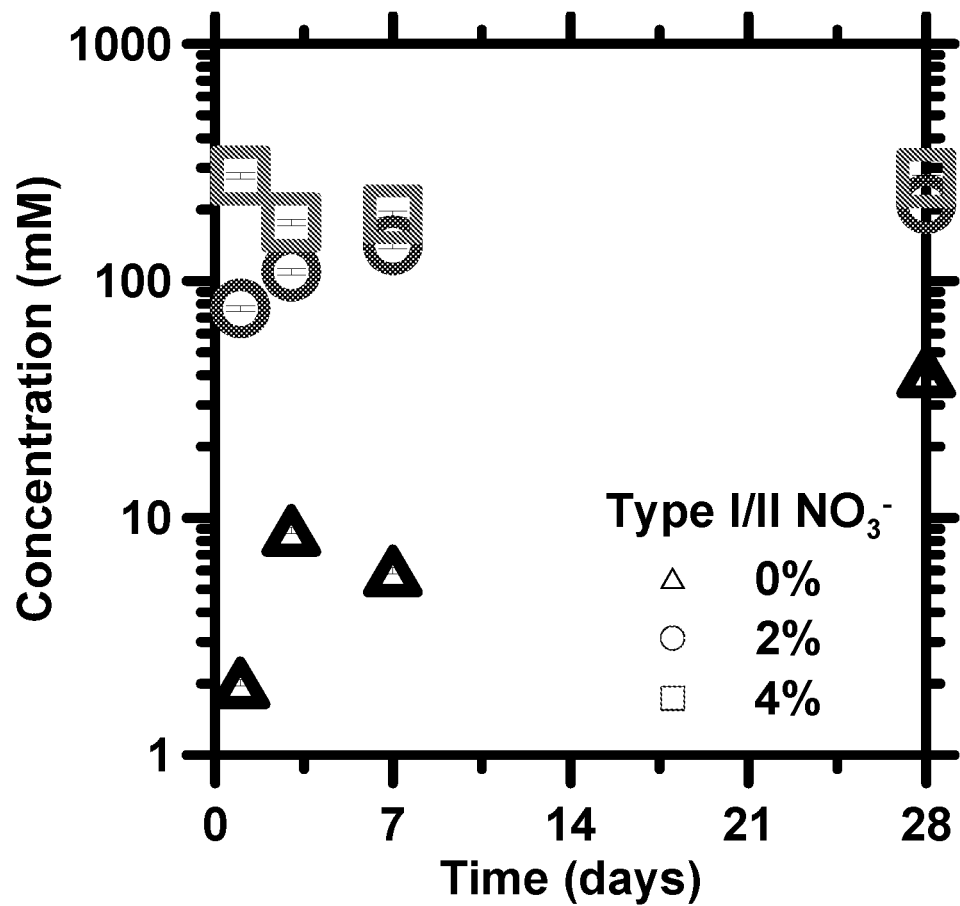
FIG. 8. Measurements of the concentrations of nitrate ions in pore solutions of concrete mixtures, with varying dosages of calcium nitrate (expressed as a percentage by mass of a cement contained in the concrete mixtures) and as a function of time.
Figure 9:
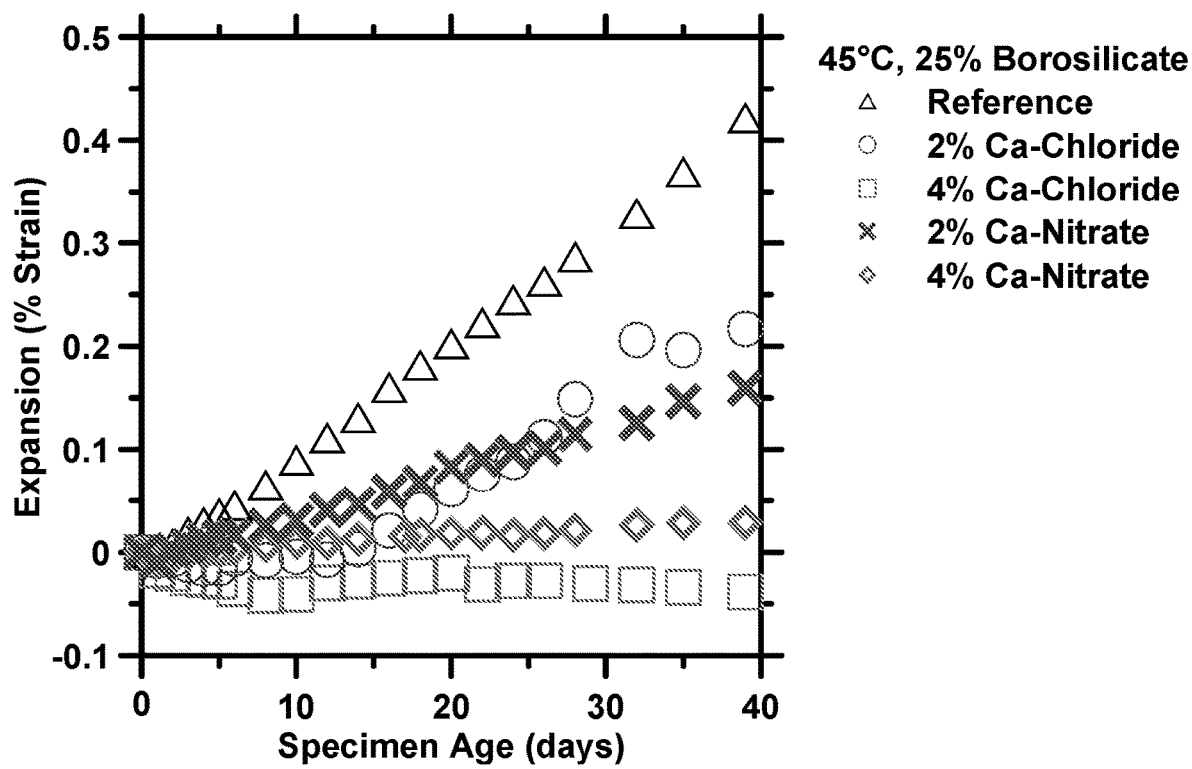
FIG. 9. Comparisons of expansion reductions in concrete mixtures with dosing of calcium nitrate and another soluble calcium-containing salt, namely calcium chloride. Dosages of the calcium-containing salts are expressed as a percentage by mass of a cement contained in the concrete mixtures.

Measurements were made of the concentrations of nitrate ions in pore solutions of concrete mixtures, with varying dosages of calcium nitrate and as a function of time. As shown in FIG. 8, the concentrations of nitrate ions in the pore solutions with addition of calcium nitrate are roughly similar. These results indicate that ASR inhibition is likely not derived from nitrate, but rather derives from calcium. Comparisons were made of expansion reductions in concrete mixtures with dosing of calcium nitrate and another calcium-containing salt, namely calcium chloride, along with a reference concrete mixture in the absence of any dosing (see FIG. 9). Like calcium nitrate, calcium chloride suppresses expansion based on the mechanism of formation of calcium-containing interfacial barriers to slow aggregate dissolution.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A manufacturing method, comprising:
    subjecting aggregates to pre-treatment to form pre-treated aggregates;
    incorporating the pre-treated aggregates into a concrete mixture; and
    curing the concrete mixture to form a concrete product,
    wherein subjecting the aggregates to pre-treatment includes exposing the aggregates to a solution including a divalent cation-containing additive.

2. The manufacturing method of claim 1, wherein subjecting the aggregates to pre-treatment includes forming a divalent cation-containing interfacial barrier at least partially covering the aggregates.

3. The manufacturing method of claim 1, wherein the aggregates include silica, and the divalent cation-containing additive suppresses alkali-silica reaction of the aggregates.

4. The manufacturing method of claim 1, wherein the aggregates include at least one of (a) silicate glass or (b) strained or microcrystalline quartz.

5. The manufacturing method of claim 1, further comprising identifying the aggregates as prone to alkali-silica reaction, and wherein subjecting the aggregates to pre-treatment is responsive to identifying the aggregates as prone to alkali-silica reaction.

6. The manufacturing method of claim 1, wherein exposing the aggregates to a solution including a divalent cation-containing additive includes adjusting an amount of the divalent cation-containing additive according to at least one of an amount of the aggregates or a reactivity of the aggregates.

7. The manufacturing method of claim 1, wherein the divalent cation-containing additive is a calcium-containing salt, a magnesium-containing salt, or the combination thereof.

8. The manufacturing method of claim 1, wherein the divalent cation-containing additive is a calcium-containing salt.

9. The manufacturing method of claim 8, wherein the calcium-containing salt is calcium chloride or calcium nitrite.

10. The manufacturing method of claim 9, wherein the calcium-containing salt is calcium nitrate.

11. The manufacturing method of claim 1, wherein the concrete mixture includes a cement, and the divalent cation-containing additive is incorporated into the concrete mixture in an amount of at least 1% by mass, relative to a mass of the cement included in the concrete mixture.

12. The manufacturing method of claim 1, wherein the divalent cation-containing additive is incorporated into the concrete mixture in an amount sufficient to attain an initial concentration of the divalent cation ions in a pore solution of the concrete mixture of at least 30 mM.

13. The manufacturing method of claim 2, wherein the divalent cation-containing interfacial barrier includes calcium-silicate-hydrate and calcite.

* * * * *